June 16, 1942.    K. D. McMAHAN    2,286,750
DYNAMO-ELECTRIC MACHINE
Filed July 26, 1940    2 Sheets-Sheet 1

Inventor:
Kenton D. McMahan,
by Harry E. Dunham
His Attorney.

June 16, 1942.   K. D. McMAHAN   2,286,750
DYNAMO-ELECTRIC MACHINE
Filed July 26, 1940   2 Sheets-Sheet 2
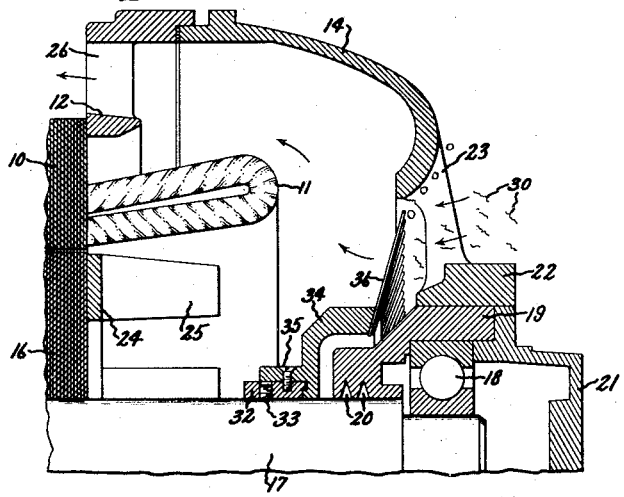
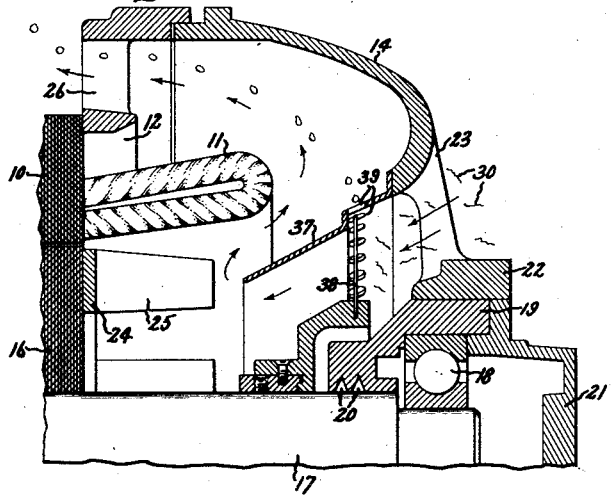
Inventor:
Kenton D. McMahan,
by Harry E. Dunham
His Attorney.

Patented June 16, 1942

2,286,750

UNITED STATES PATENT OFFICE 2,286,750

DYNAMOELECTRIC MACHINE

Kenton D. McMahan, Scotia, N. Y., assignor to General Electric Company, a corporation of New York Application July 26, 1940, Serial No. 347,813

7 Claims. (Cl. 171—252)

My invention relates to improvements in dynamo-electric machines, and more particularly to an improved ventilating system for such machines.

An object of my invention is to provide a dynamo-electric machine having an improved ventilating system.

Another object of my invention is to provide an improved air cleaning construction.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
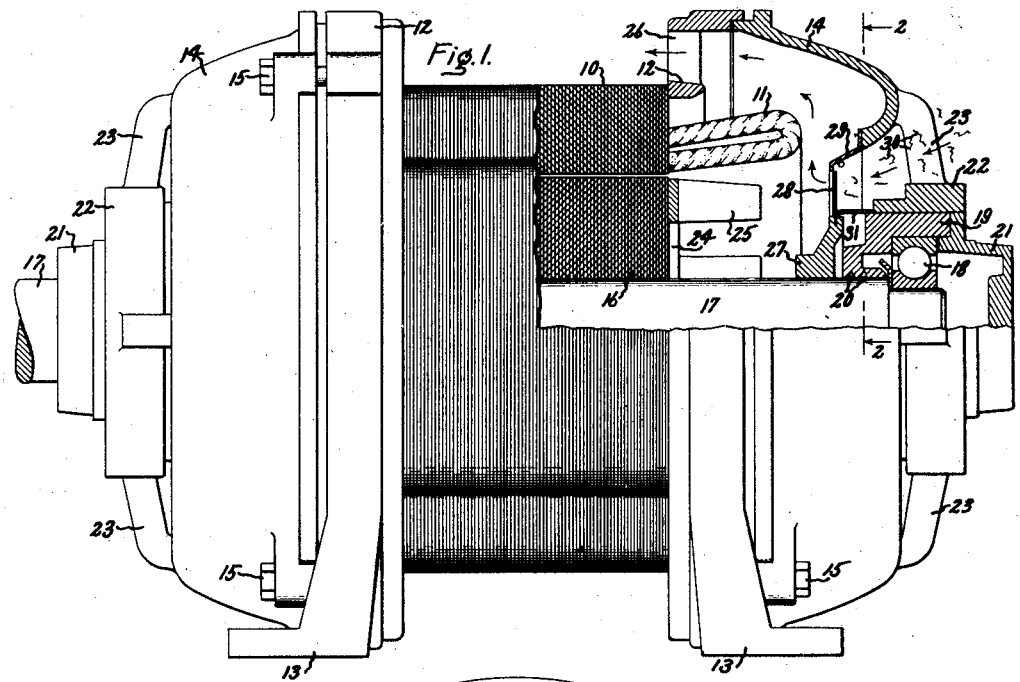
Figure 2:
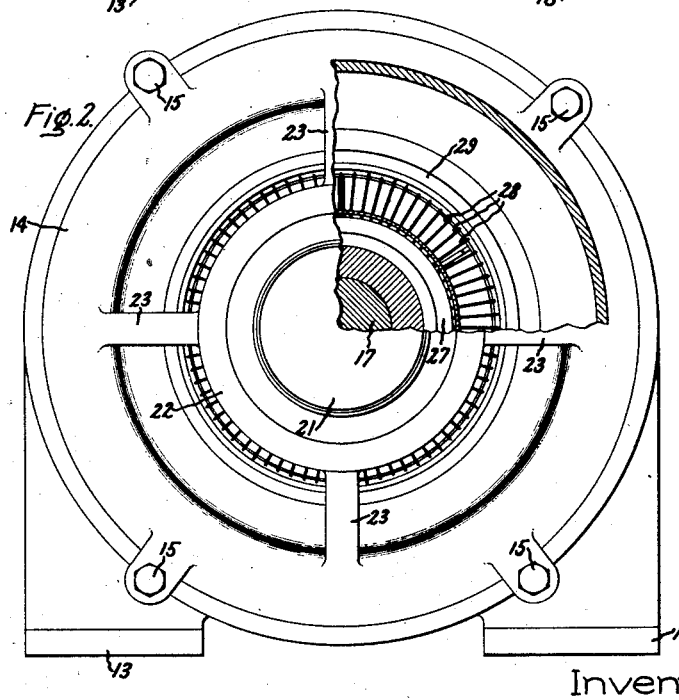

In the drawings, Fig. 1 is a side elevational view, partly broken away, of a dynamo-electric machine provided with one embodiment of my improved ventilating system; Fig. 2 is an end view of the machine shown in Fig. 1 with a quarter section taken along line 2—2 of Fig. 1; Fig. 3 is a partial side elevational view of one end of a dynamo-electric machine showing another embodiment of my invention; and Fig. 4 is a partial side elevational view of one end of a dynamo-electric machine illustrating a further modification of my improved ventilating system.

Referring to the drawings, I have shown in Figs. 1 and 2 a dynamo-electric machine having a stationary member provided with a core 10 of magnetic material adapted to be excited by a winding 11. The core 10 is retained in assembled relation by a casing including supporting end rings 12 arranged at each end thereof and provided with integrally formed supporting feet 13. An end shield 14 is arranged adjacent each end of the end rings 12 and is secured thereto by bolts 15 to provide a closure for each end of the casing and for supporting the rotatable member of the machine. The rotatable member of the machine is provided with a core 16 of magnetic material supported upon a shaft 17 mounted in bearings 18. The bearings 18 are supported on the stationary member casing by a sealing ring 19 formed with sealing grooves 20 for preventing the escape of lubricant from the bearing housing to the interior of the machine and an end cap 21 is arranged over the outer end of the bearing and provides a lubricant reservoir and closure for preventing the entrance of foreign material into the bearing. The sealing ring 19 is mounted in an annular flange 22 supported by arms 23 formed integral with the end shield 14. Both ends of the machine are substantially the same, and, therefore, a sectional view of only one end has been shown in Fig. 1. The rotatable member of the machine reacts electrodynamically with the stationary member of the machine by torque reactions developed by a squirrel-cage winding arranged in the rotatable member 16 and including end rings 24. In order to improve the cooling of a machine, the rotatable member is formed with a fan at each end thereof including impeller blades 25 formed integral with the end rings 24 which are adapted to draw air into the machine through inlet openings in the casing end shields 14 between the supporting arms 23 and blow this air over the stationary member winding 11. This air then is exhausted from the stationary member casing through circumferentially extending exhaust openings 26 formed in the clamping rings 12 about the inner radial surface thereof.

Under certain conditions, the atmosphere surrounding a dynamo-electric machine may be heavily laden with foreign particles which might enter the machine and close or partially close the space through which the ventilating air is blown and may collect about the winding elements of the machine and prevent or impede the transfer of heat from the machine parts to the cooling air. It has been found that this condition is particularly troublesome where the foreign particles are very fine and deformable, such as the lint which occurs in textile factories. In order to prevent over-heating and damage to the machine, it has been found necessary to clean these machines with compressed air at very frequent intervals. In my improved machine an air cleaning arrangement is provided on the rotatable member of the machine which obviates or greatly improves this condition so that only substantially clean air is drawn into the interior of the machine casing by the fan blades 25. This air cleaning arrangement includes a rotatable pinwheel member 27 mounted upon the shaft 17 provided with a plurality of circumferentially spaced apart outwardly extending substantially radial pins 28. The air is adapted to be drawn by the rotation of the fan blades 25 through the inlet openings in the end shield between the arms 23 and to pass through the pins 28 of the pinwheel. In order to direct the air to the rotatable pins 28, a baffle 29 is secured to the end shield 14 and is provided with a tapered surface which extends towards the pin wheel into closely adjacent relation with the outer ends of the pins 28. Thus, when the machine operates, lint particles 30 are drawn with the air to the pin elements 28 of the pinwheel, and as the pinwheel rotates, the lint is collected upon the pins. Centrifugal force will cause the lint and other foreign particles to move outwardly along the pins 28 and collect in little nodules which are thrown off against the inwardly tapered frustoconical surface of the baffle 29 from which they are deflected outwardly from the machine. A cylindrical sleeve or baffle 31 is mounted on the sealing ring 19 and extends to a position closely adjacent the outer peripheral edge of the pinwheel 27 adjacent the inner ends of the pins 28, so as to prevent the accumulation of lint or other foreign particles around the shaft adjacent the pinwheel.

In Fig. 3 there is shown a modification of the arrangement shown in Figs. 1 and 2 wherein the air laden with lint and other foreign particles 30 is drawn through the inlet openings between the arms 23 of the end shield 14 by the fan blades 25. This air passes through a pinwheel which comprises a mounting ring 32 secured to the shaft 17 by a set screw 33 and an annular sleeve 34 secured to the mounting ring 32 by a screw 35 and provided with a plurality of outwardly extending pins 36. The lint is collected on the pins 36 and centrifugal force causes the particles to move outwardly along the pins and collect in small nodules which are thrown off from the ends of the pins. In this arrangement, the pins are set at an angle, so that the collected particles are thrown outwardly from the machine as they pass from the ends of the pins. This construction is somewhat more simple than that shown in Figs. 1 and 2 in that a deflecting baffle is not required.

In Fig. 4 is shown a further modification of my invention wherein the ventilating air laden with lint and other foreign particles 30 is drawn by the fan blades 25 into the machine through inlet openings formed in the end shield 14 between the arms 23. A frustoconical baffle 37 is secured to the end shield for directing the air entering the machine towards the rotatable member of the machine. As in the other constructions, a pinwheel is provided which is mounted upon the shaft 17 and is provided with a plurality of outwardly extending pins 38. The baffle 37 is provided with a plurality of circumferentially extending slots or openings 39 formed adjacent the outer ends of the pins 38. As lint and other foreign particles collect upon the pins 38, centrifugal force causes them to move outwardly and collect in small nodules which are thrown off under the action of centrifugal force through the openings 39 in the baffle 37. Substantially clean air passes into the machine through the pinwheel and is directed by the inwardly tapered surface of the baffle 37 towards the rotatable and stationary members of the machine. This air then passes outwardly, as shown by the arrows, and the collected nodules of lint are carried upwardly and outwardly by the exhaust air and expelled from the machine through the exhaust openings 26 formed in the end rings 12 of the stationary supporting casing.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desired to secure by Letters Patent of the United States is:

1. A dynamo-electric machine provided with a stationary member having a casing with an air inlet opening in an end thereof and an air directing surface adjacent said opening, a rotatable member, means for drawing air into said casing through said inlet opening for cooling said machine, and means including a rotatable pinwheel mounted adjacent said inlet opening for collecting thereon foreign particles from the air passing therethrough and for throwing off by centrifugal action the collected particles for passing relatively clean air through said pinwheel, the pins of said pinwheel being arranged to extend outwardly with the ends thereof closely adjacent said air directing surface.

2. An electric machine with a casing having an air inlet opening therein and an air directing surface adjacent said opening, a rotatable member within said casing, means for drawing air into said casing through said inlet opening, means including a rotatable pinwheel mounted adjacent said inlet opening having a supporting element and a plurality of pin elements extending outwardly from said supporting element for collecting thereon foreign particles from the air passing therethrough and throwing off by centrifugal action said collected particles for passing relatively clean air through said pinwheel, and means for preventing the accumulation of foreign particles adjacent the inner ends of the pins of said pinwheel.

3. A dynamo-electric machine provided with a stationary member having a casing with an air inlet opening in an end thereof, a rotatable member, means for drawing air into said casing through said inlet opening for cooling said machine, means including a rotatable pinwheel mounted adjacent the inlet opening for collecting thereon foreign particles from the air passing therethrough and for throwing off said collected particles for passing relatively clean air through said pinwheel, and means including a baffle having an inwardly tapered surface for directing air from said inlet opening towards said pinwheel and for deflecting outwardly from said inlet opening the foreign particles thrown off by said pinwheel.

4. A dynamo-electric machine provided with a stationary member having a casing with an air inlet opening in an end thereof, a rotatable member, means for drawing air into said casing through said inlet opening for cooling said machine, means including a rotatable pinwheel mounted adjacent said inlet opening for collecting thereon foreign particles from the air passing therethrough and for throwing off by centrifugal action collected particles for passing relatively clean air through said pinwheel, and means including a baffle having an inwardly tapered surface for directing the air from said inlet opening towards said pinwheel and into closely adjacent circulation with said rotatable and stationary machine members.

5. A dynamo-electric machine provided with a stationary member having a casing with an air inlet opening in an end thereof, a rotatable member, means for drawing air into said casing through said inlet opening for cooling said machine, means including a rotatable pinwheel mounted adjacent said inlet opening for collecting thereon foreign particles from the air passing therethrough and for throwing off by centrifugal action the collected particles for passing relatively clean air through said pinwheel, and means for directing the air from said inlet opening towards said pinwheel and into closely adjacent circulation with said rotatable and stationary members and for deflecting outwardly from said inlet opening the foregin particles thrown off by said pinwheel.

6. A dynamo-electric machine provided with a stationary member having a casing with an air inlet opening in an end thereof, an air exhaust opening in said casing, a rotatable member, means for drawing air into said casing through said inlet opening for cooling said machine means including a rotatable pinwheel mounted adjacent said inlet opening for collecting thereon foreign particles from the air passing therethrough and throwing off said collected particles for passing relatively clean air through said pinwheel, and a baffle having an inwardly tapered surface for directing the air from said inlet opening towards said pinwheel, means including openings through said baffle adjacent the outer ends of the pins of said pinwheel and having a surface arranged for directing the cleaned air towards said rotatable and stationary members and for allowing the collected foreign particles to be thrown off by said pinwheel through said baffle openings and to be blown out of said casing by the cleaned air as it is exhausted through said exhaust opening.

7. An air cleaning construction including a casing having an inlet opening therein, means for drawing air through said inlet opening, an inwardly tapered surface arranged adjacent said inlet opening, means arranged to cooperate with said tapered surface and including a rotatable pinwheel adjacent said inlet opening through which the air is drawn for collecting foreign particles in the air on to said pinwheel and forcibly throwing off said collected particles from said pinwheel outwardly toward said tapered surface to remove the foreign particles from the air passing through said pinwheel, and means for preventing the accumulation of foreign particles adjacent the inner ends of the pins of said pinwheel.

KENTON D. McMAHAN.